Patented Jan. 21, 1941

2,229,524

UNITED STATES PATENT OFFICE 2,229,524

METHOD OF MAKING ENAMEL WARE

Jacob E. Rosenberg, Pittsburgh, Pa., assignor to Enamelers Guild, Inc., a corporation of Pennsylvania No Drawing. Application January 14, 1939, Serial No. 251,031

2 Claims. (Cl. 91—73)

This invention is found in a method of making enamel ware; its objects are a product of high quality and serviceability.

In Letters Patent of the United States No. 2,043,559, granted June 9, 1936, and No. 2,086,190, granted July 6, 1937, both on my application, I have described and claimed both a frit for the production of enameled steel articles, and methods of procedure, and a product. The frit is distinguished in that it includes with the glass-forming components an iron-erosive element. When the frit has been worked with water and clay to a slip, and the slip has been applied to the steel surface, and the so-formed coating has been dried and fired, and a coating of molten enamel has been developed upon the steel surface, that iron-erosive element erodes the steel and penetrates its surface. The patents further disclose methods by which the surface of the steel may be incompletely screened from the erosive attack of the molten enamel, and the attack may be rendered discontinuous and effective only at minutely spaced intervals. The consequence is that, when the firing is completed and the article cooled, the enamel coat is secured to the steel by the minute penetration of the now solid glass at minutely spaced intervals into the substance of the steel.

In operation under the patent I have made further invention. The erosion of the surface of the steel, which is an essential feature of the invention, involves oxidation of iron at the surface of the steel article, and the iron oxide inevitably goes into solution in the molten glass. Obviously, such erosion begins after the coating has been melted upon the steel surface, and obviously solution of iron oxide occurs at the steel interface of the molten enamel. In the coating of the steel with a single coat of enamel the iron oxide does not in the firing thoroughly permeate the layer, and in the finished article there is no manifest discoloration. If a white coat is intended, a white coat is gained. In the production, however, of ware with more coats than one, an iron stain is likely to reach the outer surface. I have studied the matter and found the controlling circumstance to be the duration of time that the ground coat continues in molten state. If but a single coat is developed, the time (typically five minutes) during which the melted coat continues fluid is long enough to mature the coating, to allow the erosive process to progress to adequate degree, but is not long enough to permit the permeation of the oxide through the fluid layer to the air interface. When, however, two coats are successively applied, the ground coat necessarily is brought a second time to fluid state, and in that case the additional period of time (typically three minues—a period during which erosion is renewed) is sufficient to allow the iron oxide to permeate not the ground coat only but in some cases the second coat as well, and so discolor objectionably the outer surface of the finished article.

In the firing of a ground coat, a critical peak temperature, that varies as the ingredients of the frit vary, must be reached, and being reached must be maintained for a sufficient length of time. Typically, this time may, as has been said, be of the order of five minutes. I have observed that while, in order to gain proper bonding, the critical high temperature must be maintained for (say) five minutes, the complete fusion of the coating and the maturing of the enamel layer are effected in less time—a time interval that (if five minutes be required for bonding) may amount to two minutes and a half. And my invention consists in the discovery that, if the initial firing be intermitted when fusion has been effected and the enamel layer matured, but before a sufficient interval has elapsed to achieve effective bonding; and if upon the so incomplete article the second coat be spread; and if then firing be renewed and continued for an interval of time sufficient to fuse and to mature the second coat, the aggregate of the two firing periods will be sufficient for the development of effective bonding. The bonding will be adequate, but the erosion of the steel will not be excessive and the finished article will not be superficially discolored by iron-oxide stain.

In exemplification of what has been said I shall recite the details of actual procedure.

With 100 parts of an enamel, suitable for bonding to steel, are milled 7 parts of clay, ¼ of magnesium carbonate, and 40 of water, so that a 100-gram sample of the milled enamel will leave a residue of between 0 and 10% on a 200-mesh screen. This constitutes the slip. The fineness of grinding is determined by the manner in which the enamel is to be applied and the shape of the article to be enameled.

The slip is applied to the metal to be enameled by spraying or dipping. After drying, the piece is fired. In the case of the coating whose composition is given below, the enamel will fuse out to a glossy surface, that is to say, mature, at a temperature of 1520° F. in about 2½ minutes. A firing time of approximately 5 minutes will, however, be required to produce adhesion of this enamel to the steel.

In the procedure of the invention, the ground coat will initially be fired at 1520° for a shorter period—say for 3 minutes. After firing, the ware is cooled, and a cover coat is applied. This cover coat is one that matures at about the same temperature as the first coat. After drying, the article is fired at 1520° for 2½ minutes. In this second firing the cover coat is properly matured and, at the same time, the bonding process which was initiated in the first firing continues to satisfactory completion.

While the firing temperature and time of the first coat may be varied, it should be sufficient to mature the enamel; that is, to form a continuous coating. The firing time of a cover coat should then be sufficient to complete the bonding without excessive erosion of the steel.

A typical frit suitable for the ground coat is the following:

|  | Parts |
|---|---|
| Feldspar | 30 |
| Silica | 16.5 |
| Borax | 27 |
| Cryolite | 16.5 |
| Fluorspar | 3.5 |
| Niter | 5 |
| Sodium antimonate | 17 |

A frit suitable for a cover coat to fire upon the ground coat specified has the following composition:

|  | Parts |
|---|---|
| Borax | 28 |
| Silica | 30 |
| Feldspar | 18 |
| Soda | 4.5 |
| Soda niter | 2.5 |
| Fluorspar | 4 |
| Cryolite | 13.5 |
| Zinc oxide | 3 |
| Antimony oxide | 3.5 |

On the firing of the ground coat the molten glass will carry an antimony pentoxide content, as explained in the specification of the Letters Patent first named above.

I claim as my invention:

1. The method herein described of developing upon the surface of a steel article two superposed coats of enamel and of unstained superficial appearance, which consists in firing upon the steel surface at full enamel-maturing temperature and for substantially 2½–3 minutes a coat of melted frit that in molten state carries an antimony-pentoxide ingredient, cooling, firing upon the so-developed ground coat at full enamel-maturing temperature and for substantially 2½ minutes a second coat of melted frit.

2. The method herein described of developing upon the surface of a steel article two superposed coats of enamel and of unstained superficial appearance which consists in applying to the steel surface a slip for ground coat compounded of a frit containing sodium antimonate in quantity of substantially 14.7%, and firing the ground coat at full enamel-maturing temperature for substantially 2½–3 minutes, cooling, applying a slip for a second coat, and firing again at full enamel-maturing temperature for substantially 2½ minutes.

JACOB E. ROSENBERG.